Sept. 15, 1964 G. MERZ ETAL 3,149,313

FERRITE MATRIX STORAGE DEVICE

Filed July 15, 1958

INVENTORS

G. MERZ - H. REINER

BY

ATTORNEY

United States Patent Office 3,149,313 Patented Sept. 15, 1964

3,149,313

FERRITE MATRIX STORAGE DEVICE

Gerhard Merz, Rommelshausen, Wurttemberg, and Hans Reiner, Stuttgart, Germany, assignors to International Standard Electric Corporation, New York, N.Y., a corporation of Delaware Filed July 15, 1958, Ser. No. 748,747
Claims priority, application Germany Aug. 3, 1957
3 Claims. (Cl. 340—174)

The invention relates to a ferrite matrix storage device employing a series readout, so constructed that the readout signals at the output all have the same polarity which is independent of the physical location of the respectively read storage element within the storage matrix. Of particular importance regarding the design of such storage matrices is the problem of the noise pulses appearing on the readout wire leading through the storage elements to be read. The complete noise signal is composed of a plurality of individual noise pulses chiefly caused by a residual permeability within the point of remanence of the cores which have been marked or energized by half-currents, and by the undesired direct inductive interaction between the readout wire and the reading circuits effective during the selection of a particular storage element.

As is well-known, an inductive control or interaction between the readout wire and the reading circuits may be utilized to compensate of the noise pulses, by using a special transformer coupling, whereby there is produced in the readout wire a compensation pulse which is dependent upon the reading pulses in the reading circuits.

In other types of conventional arrangements the reading wire is so conducted through the elements that the noise pulses substantially annul each other due to the residual permeability. FIG. 1 shows a known storage matrix comprising individual ferrite cores which are accessible over line and column wires. The common readout wire is so disposed and arranged that the undesired inductive interaction will be partly compensated. However, the known arrangement has the disadvantage that the reading signal, which depends on the position of the called-up storage core in the matrix, will have either a positive or a negative sign. In several cases this will cause difficulties, especially when the writing-in and reading-out processes are carried out independently of each other with respect to time.

The invention is based on the problem of providing a storage matrix which delivers readout signals of the same sign or polarity and yet requires only a small additional investment for compensating the noise pulses.

An object of the present invention is a ferrite matrix storage device comprising storage elements which are accessible via line and column wires, and which are actuated by means of half-writing and reading pulses; and further comprising a readout wire which is common to all storage elements, and so disposed and arranged with respect to the various line and column wires that the readout signals are all of the same sign or polarity independently of the position of the respectively read storage element within the matrix.

According to the invention the reading pulses are capable of being simultaneously fed to two column or line wires in an opposite sense in order to compensate the column or line noise pulses.

The above-mentioned and other features and objects of the invention and the manner of attaining them will become more apparent and the invention itself will be best understood by reference to the following description of an embodiment of the invention taken in conjunction with the accompanying drawings, in which.

Figures 1, 2, 3:
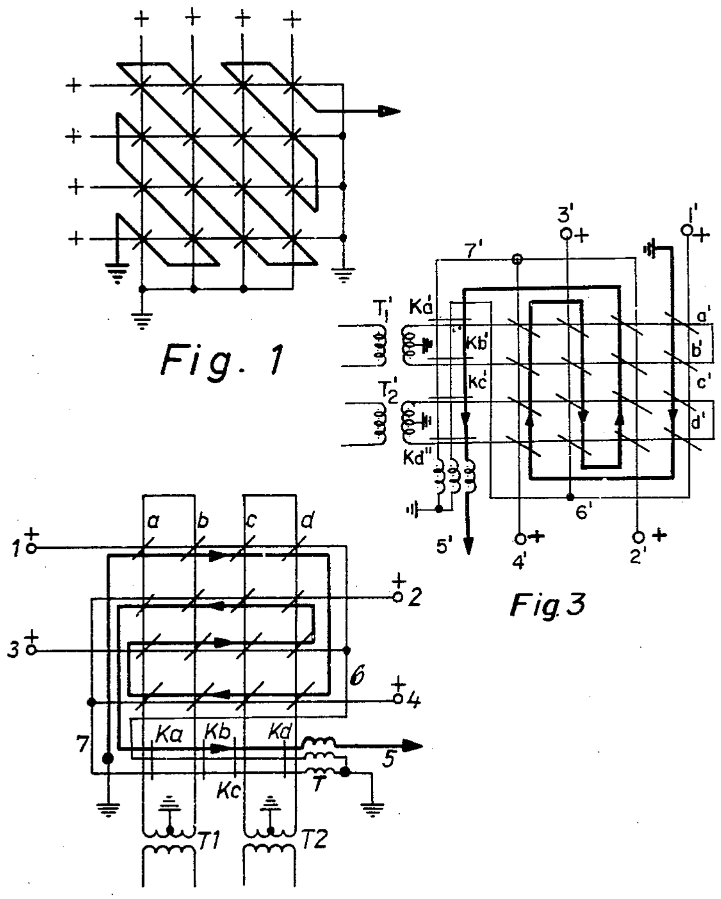
FIG. 1 is a diagram of a known matrix arrangement.
FIG. 2 is a diagram of a matrix according to the invention.
FIG. 3 is a diagram of a modified form of the matrix of FIG. 2.

FIG. 2 shows a square-type storage matrix comprising four line wires 1 . . . 4, four column wires *a* . . . *d*, as well as the readout wire 5. The column wires *a* and *b* and *c* and *d* respectively are connected together in pairs and each pair is connected to the output winding of a respective transformer T1 and T2. Accordingly, each pair of column wires together with the output winding of the transformer associated therewith constitute a closed circuit, so that half-writing and reading pulses, which are applied to the input of the transformer, will flow through the two column wires in opposite directions. If, for example, the column wire *a* is energized by a positive half-writing pulse, then the column wire *b* will simultaneously be energized by an equivalent negative pulse. On the other hand *a* will be energized by a negative pulse whenever a half-writing pulse flows in wire *b* in the positive direction.

In order to explain the mode of operation of the circuit arrangement more particularly it will be assumed that to the two binary conditions 1 and 0 there are assigned respectively a positive or negative remanence condition of the storage elements. As the starting condition there is assumed the condition of a negative remanence, i.e., the condition "0" for all storage elements. In the example shown in FIG. 2 individual ferrite cores are provided as storage elements. Of course, it is also possible that any other type of hysteresis storage element may be used, such as ferrite plates provided with corresponding holes, as well as ferro-electric storage devices.

Assuming now that in the storage matrix according to FIG. 2 the information "1" is to be written in core C2. In this case a positive half-writing pulse will be simultaneously applied to both the line wire 2 and the column wire *c*. Because of the coincidence of both pulses the core *c*2 will be positively resaturated and, after the decay of the pulses, will remain in the condition of a positive remanence. Since, together with the positive half-writing pulse in the column wire *c*, an equivalent negative pulse is flowing in the column wire *d* by reason of the transformer T2, the effect of the positive half-writing pulse in the line wire 2, with respect to the core *d*2 will be practically completely compensated, so that this core will remain in its previously assumed condition of remanence. Naturally the remaining cores of the storage matrix will not be resaturated by the half-writing pulses.

Negative half-reading pulses are used to read the stored informations. If a core had been in the condition "1" then, at the reading, it will be returned to the condition "0." This then causes a readout signal to appear at the output of the readout wire 5. However, if the selected core is in the condition "0," only a noise signal will appear at the output of the readout wire.

Referring now to the core *c*2, which will now be assumed to be in the initial or "0" condition. This core is read out by negative half-reading pulses on the line wire 2 and the column wire *c*. Due to the coincidence of these pulses the condition of the core *c*2 is displaced from the negative point of remanence further into the area of a negative saturation. Together with the negative half-reading pulse in the line wire 2 there will flow in the column wire *d* a corresponding positive pulse, so that in this case the pulse effects upon the core *d*2 will mutually annul each other and will not contribute towards the signal on the readout wire. On the other hand the cores *a*2 and *b*2 of line 2 which are driven more negative as well as the core *c*2 will cause a noise pulse. The cores *c*1, *c*3, *c*4 and *d*1, *d*3, *d*4 of the columns *c* and *d* however will cause noise pulses which compensate each other, since the column wires *c* and *d* are traversed by the half-reading pulse in opposite directions. Accordingly, only the cores *a*2, *b*2, and *c*2 will contribute to the resulting noise signal.

The noise signal as caused by the line cores may be compensated with the aid of conventional means. Thus, in the exemplified embodiment of FIG. 2, there is provided an additional line comprising the compensating cores K*a* . . . K*d* as well as a mutual inductance T, comprising three mutually coupled windings as shown. One of these windings is connected between the common ground return and the line wires 2, 4; the other winding is connected between the common ground return and the line wires 1, 3; the third winding is connected in series with the common readout wire and may be considered as a secondary for the remaining two windings. It is possible to employ either the one or the other means, or else a combination of both means. The common readout wire 5 and the wire 6 leading from the odd numbered line wires 1, 3, etc., and the wire 7 leading from the even numbered line wires 2, 4, etc., are all conducted through the compensating cores K*a* . . . K*d*. In these lines 6 and 7, as well as in the corresponding line wires, the half-writing and reading pulses are flowing in opposite directions. In the described example, upon reading the core *c*2, the noise pulses from the cores *a*2, *b*2, and *c*2, and the compensating pulses from the four cores K*a* . . . K*d* have opposite signs.

The present example has described the compensation of the noise pulses appearing on the column wires. Of course, the same principle may also be applied to the noise pulses on the line wires instead of the column wires, preferably when the number of cores in the lines is greater than in the columns.

The circuit of FIG. 3 corresponds to that of FIG. 2, except that the line and column wires have been interposed and primes have been added to the reference characters. It will be seen that the readout wire 5' now follows the column wires 1', 2', 3', and 4', instead of the line wires. The cores K*a'* to K*d'* compensate for noise pulses appearing on the line wires.

Generally speaking, a matrix storage device according to the invention is preferably constructed in such a way that two column or line wires are joined and connected to a common transformer. Appropriately each of the transformers is fed by an input device (not shown in FIG. 2) but connected to the primary windings of the transformers T1, T2, etc., which whenever a reading is effected via the one column or line assigned to the transformer, will deliver a pulse of the one polarity and, when a reading is effected via the other column or line, will deliver a pulse of an opposite polarity.

The above described manner of compensating the noise pulses bears the special advantage that 50 percent of the transformers and input devices necessary to feed the lines or column can be saved, since two columns (or lines) require only one transformer. Furthermore, the wiring of the circuit arrangement is simplified, since otherwise, to effect the compensation, the readout wire must be threaded diagonally through the individual cores of the storage device, as indicated in the known arrangement shown in FIG. 1.

Due to the fact that the readout signals are always of the same sign, a substantially simpler construction in the design of the readout amplifiers is afforded.

The described ferrite matrix storage device may be advantageously employed as a series storage device with an external writing-in, e.g., as a storage device for automatic message accounting. In this case further savings will result in that for line and column wires pulses of one sign only are required. Of course, each line still needs a transformer, but two lines only require one input transformer device. Accordingly, on the whole a substantial saving with respect to the total expense will result, by simultaneously improving the properties of the storage device.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A ferrite matrix storage device comprising a coordinate array of ferrite storage elements, first selecting wires threading corresponding series of said storage elements in a first coordinate direction, alternate ones of said first selecting wires threading said corresponding series of storage elements in different magnetic senses, second selecting wires threading corresponding series of said storage elements in a second coordinate direction transverse to said first direction, said second wires being connected in pairs for simultaneously driving the corresponding pairs of series, in said second direction, in opposite magnetic senses during the reading out of an element in either series of said pair, and a common readout wire threading sequentially through all of said series in said first direction in the same sense as the corresponding first wires threading therethrough, whereby output signals induced in said readout wire due to reversals in state of selected storage elements are of the same polarity for all of said storage elements, while output noise signals, due to minor loop hysteresis effects in the unselected elements threaded by an excited pair of said second selecting wires, are cancelled by virtue of the said connection of said pair.

2. A ferrite matrix storage device comprising a coordinate array of storage elements arranged in rows and columns, line selecting wires individually associated with said rows, alternate ones of said line wires threading the elements in said associated rows in different magnetic senses, column selecting wires individually associated with said columns, said column wires being connected in pairs for simultaneously driving the elements in the associated pairs of columns in opposite magnetic senses during read out of an element in one column of a pair of columns, and a common readout wire threading sequentially through all of said rows in the same sense as the said row wires threading the said rows.

3. A ferrite matrix storage device comprising a coordinate array of storage elements arranged in rows and columns, column selecting wires individually associated with said columns, alternate ones of said column wires threading the elements in the associated columns in different magnetic senses, line selecting wires individually associated with said rows, said line wires being connected in pairs for simultaneously driving the elements in the associated pairs of rows in opposite magnetic senses during read-out of an element in one row of a pair of rows, and a common readout wire threading sequentially through all of said columns in the same sense as the said column wires threading the said columns.

References Cited in the file of this patent

UNITED STATES PATENTS

| | | |
|---|---|---|
| 2,691,154 | Rajchman | Oct. 5, 1954 |
| 2,709,248 | Rosenberg | May 24, 1955 |
| 2,719,965 | Person | Oct. 4, 1955 |
| 2,802,203 | Stuart-Williams | Aug. 6, 1957 |
| 2,876,442 | Disson | Mar. 3, 1959 |
| 2,889,540 | Bauer et al. | June 2, 1959 |
| 2,897,482 | Rosenberg | July 28, 1959 |
| 2,941,090 | Lo | June 14, 1960 |
| 2,952,840 | Ridler | Sept. 13, 1960 |